US008600593B2

(12) United States Patent
Ohno

(10) Patent No.: US 8,600,593 B2

(45) Date of Patent: Dec. 3, 2013

(54) ELECTRICALLY POWERED VEHICLE

(75) Inventor: Toru Ohno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 896 days.

(21) Appl. No.: 12/451,797

(22) PCT Filed: Jun. 11, 2008

(86) PCT No.: PCT/JP2008/061079

§ 371 (c)(1), (2), (4) Date: Dec. 1, 2009

(87) PCT Pub. No.: WO2009/004920

PCT Pub. Date: Jan. 8, 2009

(65) Prior Publication Data

US 2010/0168945 A1 Jul. 1, 2010

(30) Foreign Application Priority Data

Jul. 4, 2007 (JP) ................................ 2007-176363

(51) Int. Cl.

*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.

USPC ............................................ 701/22; 903/903

(58) Field of Classification Search

USPC ........ 701/22; 307/11, 18, 22, 23, 24, 43, 109; 903/903

See application file for complete search history.

(56) References Cited

U.S. PATENT DOCUMENTS

2002/0109407 A1* 8/2002 Morimoto et al. ........... 307/10.1
2002/0190690 A1* 12/2002 Tamai et al. ................. 320/103

(Continued)

FOREIGN PATENT DOCUMENTS

JP A 10-290534 10/1998
JP A 11-164409 6/1999

(Continued)

OTHER PUBLICATIONS

Office Action issued in Japanese Patent Application No. 2007-176363 dated Nov. 22, 2011 (with translation).

(Continued)

*Primary Examiner* — Khoi Tran
*Assistant Examiner* — Jaime Figueroa
(74) *Attorney, Agent, or Firm* — Oliff & Berridge, PLC

(57) ABSTRACT

An electrically powered vehicle is connected to an external power supply through a charge plug. A relay is interposed in an electrical path extending to a power storage device from a power feed node electrically connected to the external power supply through the charge plug. A control device operates with electric power from an auxiliary machinery power supply provided separately from the power storage device and controls opening and closing of the relay in correspondence with a period during which the power storage device is charged. None of electric power consuming components mounted on the electrically powered vehicle is connected to the power feed node. Therefore, even during a period in which the electrically powered vehicle is connected to the external power supply, all electric power consuming components can electrically be disconnected from the external power supply by turning off the relay.

12 Claims, 8 Drawing Sheets

5
120
110
100
MOTOR DRIVE DEVICE
POWER STORAGE DEVICE
ELECTRIC POWER CONVERTER (CHARGE)
MG
42
30
35
50
N1
20
15
N2
40
44
45
10
AUXILIARY MACHINERY POWER SUPPLY
250
CONTROL DEVICE(ECU)
200

(56) References Cited

U.S. PATENT DOCUMENTS

| | | | | |
|---|---|---|---|---|
| 2007/0288131 | A1* | 12/2007 | Yakes et al. | 701/22 |
| 2008/0048617 | A1* | 2/2008 | Yoshida | 320/132 |
| 2008/0143183 | A1* | 6/2008 | Hoshiba | 307/31 |
| 2009/0085516 | A1* | 4/2009 | Emori et al. | 320/118 |

FOREIGN PATENT DOCUMENTS

| | | |
|---|---|---|
| JP | A 11-205909 | 7/1999 |
| JP | A 2000-232737 | 8/2000 |
| JP | A 2000-354332 | 12/2000 |
| JP | A 2002-90485 | 3/2002 |
| JP | A 2002-262474 | 9/2002 |
| JP | A-2004-147022 | 5/2004 |
| JP | A 2004-289954 | 10/2004 |
| JP | A 2005-65433 | 3/2005 |
| JP | A 2006-5996 | 1/2006 |
| JP | A 2006-6039 | 1/2006 |
| JP | A 2006-180665 | 7/2006 |

OTHER PUBLICATIONS

Search Report issued for International Application No. PCT/JP2008/061079 on Jul. 22, 2008.

* cited by examiner

ELECTRICALLY POWERED VEHICLE

TECHNICAL FIELD

The present invention relates to an electrically powered vehicle, and more specifically to an electrically powered vehicle such as an electric car, a hybrid car or the like that can be charged by an external power supply.

BACKGROUND ART

For an electric car or a hybrid car in which a motor for driving a vehicle is driven by electric power from a power storage device represented by a secondary battery, a configuration for charging the power storage device with an external power supply has been proposed.

For example, Japanese Patent Laying-Open No. 11-164409 (Patent Document 1) discloses, as a method for controlling charge of a battery for an electric car, a configuration in which a junction box containing a contactor capable of disconnecting an electrical path is arranged between an external charger and a battery for motive power connected to each other through a charge plug and an auxiliary battery is charged by a DC/DC converter connected to a charger through the charge plug. According to Patent Document 1, when a voltage of the auxiliary battery attains to a prescribed reference value at the time point of lapse of a prescribed period of time for charging, the contactor in the junction box is set to the OFF state and the DC/DC converter is controlled to stop, so that waste of the charged battery for motive power can effectively be reduced.

In addition, Japanese Patent Laying-Open No. 2000-232737 (Patent Document 2) discloses a configuration for reliably stopping control of an inverter when a charge plug is pulled out of a socket, in a charging device for charging a secondary battery by converting an external AC current to DC power by using the inverter. Specifically, such a configuration that whether external electric power is supplied or not is determined based on comparison between a current input to the secondary battery and a control target value of the inverter and when it is determined that there is no external supply of electric power, the inverter is stopped to stop charging is disclosed.

Moreover, Japanese Patent Laying-Open No. 10-290534 (Patent Document 3) discloses a battery charging device for successively calculating a remaining capacity of a battery and automatically stopping charging when the remaining capacity attains to 100%. Specifically, when the remaining capacity attains to 100%, a contactor (a relay or a switch) arranged between a charger and the battery is opened even though a charge instruction switch is operated. Thus, overcharge of the battery and waste of electric power can be avoided.

Further, Japanese Patent Laying-Open No. 2004-289954 (Patent Document 4) discloses, as a power supply control device of a battery vehicle capable of achieving reduced current consumption while a key switch is turned off, a control configuration capable of reducing current consumption by turning off also a DC/DC converter for supplying power to a controller while the key switch is turned off. According to this power supply control device, when a charge plug is inserted in a charge connector, a relay contact is closed in response to a sensing signal from an AC detection circuit, so that power supply from the DC/DC converter to the controller is started and the controller can operate.

Japanese Patent Laying-Open No. 11-205909 (Patent Document 5) discloses a charging device for an electric car capable of checking an operation of a ground fault interrupter during charge of the electric car. According to this charging device for an electric car, during charging, a leakage test relay is closed to forcibly cause a short circuit and whether the leakage relay is disconnected or not is checked. After it is confirmed that a disconnection relay has been disconnected, a charge relay is closed and charging can be started.

Similarly, Japanese Patent Laying-Open No. 2000-354332 (Patent Document 6) discloses a configuration in which, in connecting a plug of a charging device to a socket for starting charging, leakage is technically caused by using a test circuit and charging is started on condition that a leakage detection circuit normally operates at this time. By doing so, such a defect as electric shock can be prevented and safety can be ensured.

DISCLOSURE OF THE INVENTION

As described above, in charging an electrically powered vehicle such as an electric car or a hybrid car with an external power supply, for example, such a manner of use that a charge plug of the electrically powered vehicle is connected to a socket for charging after getting off the car upon arriving home and the vehicle is charged during the night, and the charge plug is removed from the socket at the time of leaving home next day and drive is started is expected. Therefore, during charge of the electrically powered vehicle with the external power supply, the charge plug is connected to the external power supply for a relatively long period of time.

In addition, in an example where an electrically powered vehicle is used daily for driving to and from work, such charging is repeated every day. Therefore, suppression of stand-by power in the external power supply while the charge plug is connected for a long period of time as above may be demanded as strongly as suppression of stand-by power in home electric appliances.

From such a point of view, according to the configuration disclosed in Patent Document 1, waste of electric power in the electric car is effectively suppressed, however, the DC/DC converter is constantly connected to the charge plug while the charge plug is connected. Therefore, even though the DC/DC converter is set to a non-operating state, stand-by power is consumed by the converter and suppression of stand-by power in the external power supply (charger) while the charge plug is connected is limited.

Similarly, according to the configuration in Patent Document 2 as well, a zero-crossing detector is constantly connected between the plug and the relay. Accordingly, while the plug is connected, electric power is steadily consumed by the zero-crossing detector. Therefore, suppression of stand-by power in the external power supply is impeded.

In the battery charging device disclosed in Patent Document 3 as well, auxiliary machinery is constantly connected to the charger even though a relay 18 is disconnected. Accordingly, it is difficult to suppress stand-by power in the external power supply. In addition, in the power supply control device of the battery vehicle disclosed in Patent Document 4 as well, electric power is always consumed by the AC detection circuit while the connector is connected. This is also applicable to the configurations in Patent Document 5 and Patent Document 6, and electric power is consumed by the ground fault interrupter or a voltage sensor connected between the socket and the relay. Therefore, suppression of stand-by power while the charge plug is connected is limited.

The present invention was made to solve such problems, and an object of the present invention is to attain substantially zero stand-by power in an external power supply for a non-charging period while the external power supply and an electrically powered vehicle are connected to each other, in a power supply vehicle that can be charged by the external power supply.

An electrically powered vehicle according to the present invention is an electrically powered vehicle that can be charged by an external power supply, that includes a power feed node, a power storage device for storing electric power to be used for generating vehicle drive force, a switching element, and a control device. The power feed node is electrically connected to the external power supply through a connection device. The power storage device is configured such that it can be charged with electric power supplied by the external power supply. The switching element is interposed in an electrical path from the power feed node to the power storage device. The control device operates by using electric power from an auxiliary power storage device provided separately from the power storage device, and controls opening and closing of the switching element in correspondence with a period during which the power storage device is charged. All electric power consuming components mounted on the electrically powered vehicle are arranged to electrically be disconnected from the power feed node, as a result of opening of the switching element.

In the electrically powered vehicle above, the power feed node is disconnected from the external power supply by means of the switching element for a non-charging period, so that all electric power consuming components mounted on the electrically powered vehicle can electrically be disconnected from the power feed node, that is, from the external power supply. Therefore, substantially zero stand-by power in the external power supply during the non-charging period while the external power supply and the electrically powered vehicle are connected to each other can be achieved. In addition, as compared with a configuration where the switching element (such as a relay, a contactor, or the like) is arranged on the external power supply side, information is not communicated between the electrically powered vehicle and the outside (the external power supply), and substantially zero stand-by power can be achieved.

Preferably, the control device includes a charge start instruction unit for generating an instruction for requesting charge of the power storage device, a charge end determination unit for determining end of charge of the power storage device, and an opening and closing control unit. The opening and closing control unit turns on the switching element in response to generation of the instruction for requesting charge and opens the switching element in response to determination as the end of charge.

According to such a configuration, a charging period can be provided by turning on the switching element in response to generation of the instruction for requesting charge. In addition, a period other than the period from generation of the instruction for requesting charge to the end of charge can be defined as the non-charging period, and substantially zero stand-by power in the external power supply can be achieved.

In addition, preferably, the electrically powered vehicle further includes an internal power supply line for transmitting electric power from the external power supply, and the switching element is connected between the power feed node and the internal power supply line. The electric power consuming component includes a detector. The detector is connected to the internal power supply line, and detects whether electric power is supplied from the external power supply to the internal power supply line or not.

According to such a configuration, whether or not the external power supply and the electrically powered vehicle are connected to each other through a connection device (such as a plug, a connector, or the like) can reliably be detected by the detector. In addition, as the detector is connected to the power feed node through the switching element, the detector causes no stand-by power and substantially zero stand-by power during the non-charging period can be achieved.

Further preferably, the control device includes a charge start instruction unit for generating an instruction for requesting charge of the power storage device, a charge end determination unit for determining end of charge of the power storage device, and an opening and closing control unit for turning on the switching element in response to generation of the instruction for requesting charge and opening the switching element in response to determination as the end of charge. In particular, the opening and closing control unit causes the switching element to open when the detector does not detect electric power supply to the internal power supply line even when the instruction for requesting charge is generated.

According to such a configuration, when the external power supply and the power feed node are not connected to each other through the connection device even when the instruction for requesting charge is generated, the switching element can be maintained in the open state. Consequently, formation of an unnecessary electrical path in the electrically powered vehicle can be avoided and occurrence of leakage can be prevented.

In addition, further preferably, the control device includes a charge start instruction unit for generating an instruction for requesting charge of the power storage device, a charge end determination unit for determining end of charge of the power storage device, and an opening and closing control unit. The opening and closing control unit turns on the switching element in response to generation of the instruction for requesting charge and opens the switching element in response to determination as the end of charge. At prescribed timing after power supply of the electrically powered vehicle is stopped (for example, after turning off of a power switch), at least one prescribed timing to turn on the switching element is provided, and the charge start instruction unit generates the instruction for requesting charge when the detector detects electric power supply to the internal power supply line at the prescribed timing when the switching element was turned on. In particular, the prescribed timing to turn on the switching element is preferably set based on lapse of time since stop of the power supply.

According to such a configuration, when the electrically powered vehicle is connected to the external power supply through a connection device (such as a plug, a connector, or the like) after the end of drive of the electrically powered vehicle (after turning off of the power switch), the instruction for requesting charge can automatically be generated.

Alternatively, preferably, the control device further includes a fault detection unit for detecting occurrence of a fault in the electrically powered vehicle. The opening and closing control unit maintains opening of the switching element when the fault detection unit detects occurrence of the fault.

According to such a configuration, when a fault occurs in the electrically powered vehicle, the switching element is maintained in the open state and such a state that electric power is excessively supplied from the external power supply can be avoided. Consequently, a faulty state caused by charging by the external power supply, such as overcharge of the power storage device, can be avoided. In addition, unnecessary electric power consumption in the external power supply can also be prevented.

Further preferably, the charge start instruction unit generates the instruction for requesting charge in response to an operation input to a prescribed instruction unit.

According to such a configuration, a period during which the power storage device is charged can be provided in correspondence with a user's manual operation such as an operation of a charge instruction button or the like.

In addition, further preferably, the charge start instruction unit generates the instruction for requesting charge in response to a remaining charge amount of the power storage device.

According to such a configuration, the charging period can automatically be provided only when the remaining charge amount of the power storage device decreases. Consequently, the switching element is opened during a period in which the remaining charge amount of the power storage device is sufficient, so that electric power consumption in the external power supply while the external power supply and the electrically powered vehicle are connected to each other can be suppressed.

Further preferably, the charge start instruction unit regularly senses the remaining charge amount of the power storage device and generates the instruction for requesting charge when the sensed remaining charge amount is equal to or lower than a prescribed value.

According to such a configuration, the remaining charge amount of the power storage device can regularly be checked and the instruction for requesting charge can be generated as necessary. Therefore, it is not necessary to constantly operate the control device for sensing the remaining charge amount of the power storage device and reduction in electric power consumption by the control device can be achieved.

In addition, further preferably, the charge start instruction unit generates the instruction for requesting charge in accordance with time.

According to such a configuration, as the charging period can be set in correspondence with time designated by the user, charging or the like using inexpensive midnight electric power can be performed and convenience to the user can be improved. In addition, by opening the switching element until the designated time comes, electric power consumption in the external power supply while the external power supply and the electrically powered vehicle are connected to each other can be suppressed.

Preferably, the electrically powered vehicle further includes an internal power supply line for transmitting electric power from the external power supply, and the switching element is connected between the power feed node and the internal power supply line. The electric power consuming component includes an electric power converter. The electric power converter is provided between the internal power supply line and the power storage device, and converts electric power supply from the external power supply received through the internal power supply line into electric power for charging the power storage device.

According to such a configuration, even when the electrically powered vehicle is connected to the external power supply, the electric power converter for charging can be disconnected from the external power supply during the non-charging period. Therefore, no electric power is consumed by the electric power converter and substantially zero stand-by power in the external power supply can be achieved.

As described above, a primary advantage of the present invention is that, in a power supply vehicle that can be charged by the external power supply, substantially zero stand-by power in the external power supply during the non-charging period can be achieved while the external power supply and the electrically powered vehicle are connected to each other.

BEST MODES FOR CARRYING OUT THE INVENTION

Figure 1:
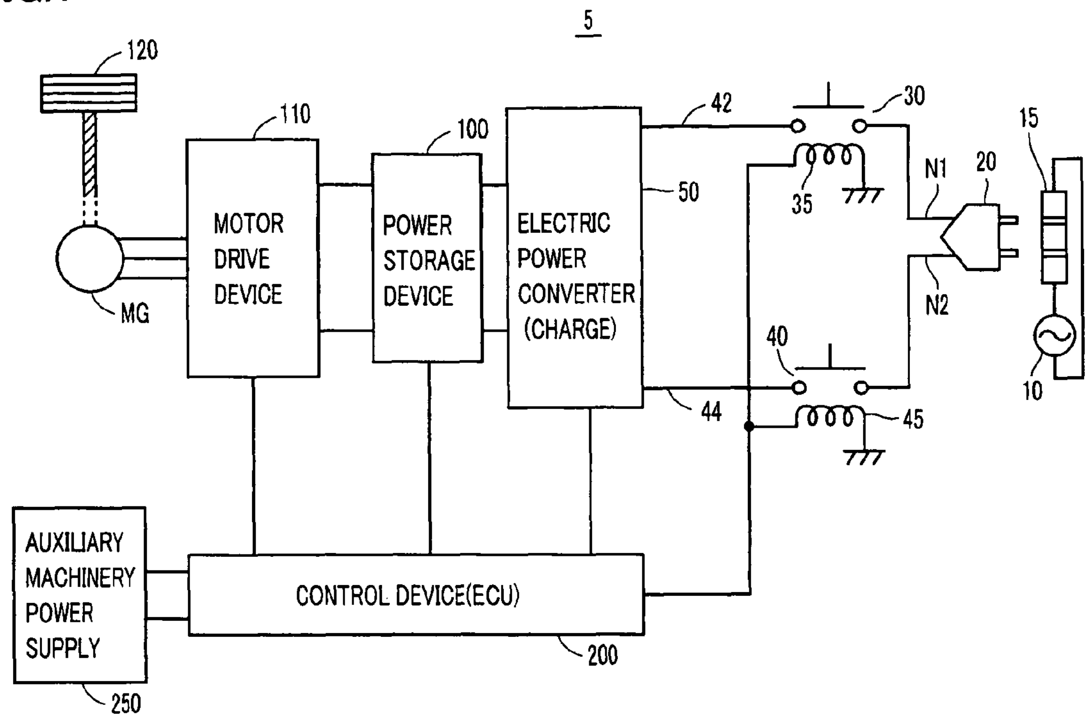
FIG. 1 is a schematic block diagram illustrating a configuration of a portion relating to charging from an external power supply in an electrically powered vehicle according to a first embodiment of the present invention.

An embodiment of the present invention will be described hereinafter in detail with reference to the drawings. In the following, the same or corresponding elements in the drawings have the same reference characters allotted, and description thereof will not be repeated in principle.

(First Embodiment)

FIG. 1 is a schematic block diagram illustrating a configuration of a portion relating to charging from an external power supply in an electrically powered vehicle 5 according to a first embodiment of the present invention.

Referring to FIG. 1, electrically powered vehicle 5 includes a connection device 20 for charging (hereinafter referred to as a charge plug 20) implemented by a plug or a connector, relays 30 and 40, excitation circuits 35 and 45 for relays 30 and 40, an electric power converter 50 for charging, a power storage device 100 for storing electric power used for generating vehicle drive force, a motor drive device 110 for controlling drive of a motor-generator MG for generating vehicle drive force by using electric power stored in power storage device 100, a wheel 120 to which drive force generated by motor-generator MG is transmitted, a control device 200 for controlling an overall operation of electrically powered vehicle 5, and an auxiliary machinery power supply 250 for supplying operating electric power to control device 200.

Power storage device 100 is representatively implemented by a secondary battery such as a lithium ion battery or a nickel hydride battery. Alternatively, power storage device 100 may be implemented by an electric double layer capacitor.

Motor drive device 110 converts electric power stored in power storage device 100 into electric power for controlling drive of motor-generator MG under the control of control device 200. Representatively, motor-generator MG is implemented by a permanent magnet type three-phase synchronous motor, and motor drive device 110 is implemented by a three-phase inverter. Output torque of motor-generator MG is transmitted to wheel 120 through a power split device or a reduction gear that are not shown, so that electrically powered vehicle 5 runs.

Motor-generator MG can generate electric power using rotational force of wheel 120 during a regenerative braking operation of electrically powered vehicle 5. The generated electric power can be used as electric power for charging power storage device 100 and auxiliary machinery power supply 250, by means of motor drive device 110.

In addition, in a hybrid car incorporating an engine (not shown) in addition to motor-generator MG, the engine and motor-generator MG operate in coordination, so that necessary vehicle drive force for electrically powered vehicle 5 is generated. Here, power storage device 100 and auxiliary machinery power supply 250 can also be charged with electric power generated by using revolution of the engine.

By inserting charge plug 20 in socket 15, power feed nodes N1 and N2 are electrically connected to external power supply 10. Electrically powered vehicle 5 is thus connected to external power supply 10. In the present embodiment, description will be given hereinafter assuming that external power supply 10 is implemented by an AC power supply (single phase), however, a configuration may also be such that external power supply 10 implemented by a three-phase AC power supply or a DC power supply charges power storage device 100.

Relay 30 is connected between power feed node N1 and an internal power supply line 42, and relay 40 is connected between power feed node N2 and an internal power supply line 44. Relay 30 is turned on while a current flows in excitation circuit 35, and it is turned off while a current does not flow in excitation circuit 35. Similarly, relay 40 is turned on while a current flows in excitation circuit 45, and it is turned off while a current does not flow in excitation circuit 45. Current flow and absence of current flow in excitation circuits 35 and 45 are controlled by control device 200 implemented by an electronic control unit (ECU).

Electric power converter 50 converts AC power from external power supply 10 transmitted to internal power supply lines 42 and 44 through relays 30 and 40 and charge plug 20 into DC power for charging power storage device 100, under the control of control device 200. It is noted that power storage device 100 may also directly be charged with electric power supplied by external power supply 10, and in that case, electric power converter 50 is not arranged.

Thus, relays 30 and 40 are interposed in electrical paths (charge paths) from respective power feed nodes N1 and N2 to power storage device 100, and ON (turning on) and OFF (opening) thereof is controlled by control device 200. It is noted that relays 30 and 40 are described as representative examples of the "switching element" in the present invention and any element that can open and close a current path is applicable instead of relays 30 and 40.

Control device 200 operates by receiving electric power supply from auxiliary machinery power supply 250 (representatively, a secondary battery) provided separately from power storage device 100. Control device 200 can operate using electric power from auxiliary machinery power supply 250, without electrical connection between external power supply 10 and the electrically powered vehicle through charge plug 20 and relays 30 and 40. It is noted that auxiliary machinery power supply 250 may be configured such that it can be charged by voltage conversion of an output voltage from power storage device 100 by a DC/DC converter (not shown).

Electrically powered vehicle 5 shown in FIG. 1 is characterized in that a group of vehicle-mounted components consuming electric power is not connected to power feed nodes N1 and N2. Namely, all electric power consuming components are connected to internal power supply lines 42 and 44 and to the inner side of the vehicle relative to the former. Consequently, even in such a state that power feed nodes N1 and N2 are electrically connected to external power supply 10 as a result of insertion of charge plug 20 in socket 15, all electric power consuming components can be disconnected from external power supply 10 by turning off relays 30 and 40, so that substantially zero stand-by power in external power supply 10 can be achieved.

Figure 2:
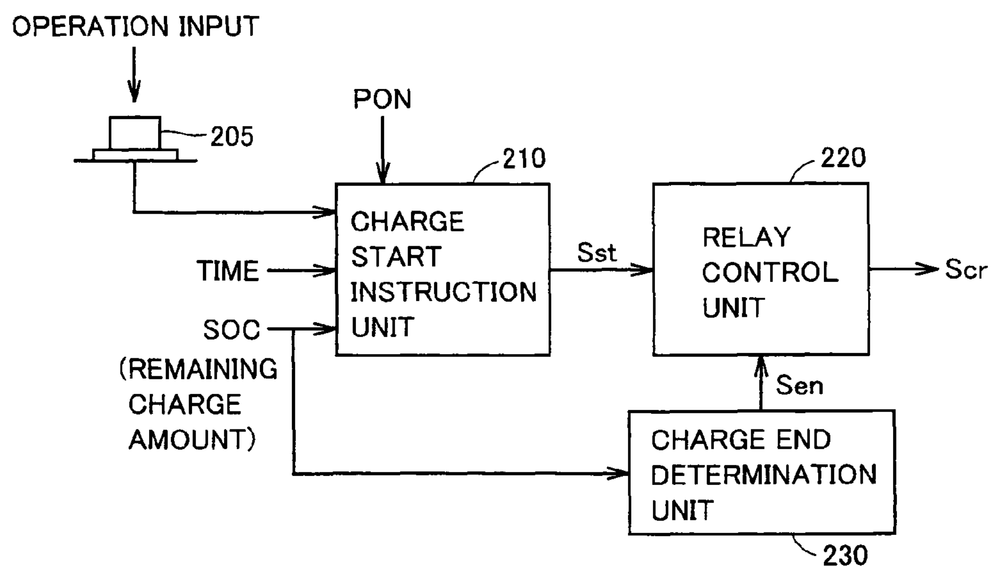
FIG. 2 is a schematic block diagram for illustrating control of charge of a power storage device by the external power supply in the electrically powered vehicle shown in FIG. 1.

FIG. 2 is a schematic block diagram for illustrating control of charge of the power storage device by the external power supply in electrically powered vehicle 5 shown in FIG. 1. Each block shown in FIG. 2 is implemented by a software or hardware operation performed by control device 200.

Referring to FIG. 2, a charge start instruction unit 210 outputs a control signal Sst indicating start of a charging period, during an OFF period of the power switch (an OFF period of a power ON signal PON) that is turned on at the time of start-up of electrically powered vehicle 5 and turned off at the time of end of drive. For example, charge start instruction unit 210 can start the charging period, with an operation of a prescribed charge request switch 205, a remaining charge amount (SOC) of power storage device 100, time, or the like serving as trigger.

A charge end determination unit 230 determines whether power storage device 100 has been charged to a target state or not when the charging period is started, and generates a control signal Sen indicating end of the charging period when it is determined that the power storage device has been charged to the target state. For example, charge end determination unit 230 can determine whether power storage device 100 has been charged to the target state or not, based on the remaining charge amount (SOC: State of Charge), an inter-terminal output voltage and a temperature of power storage device 100, or lapse of time since start of charge, or combination thereof as appropriate.

A relay control unit 220 turns on relays 30 and 40 that are once turned off at the time of end of drive of electrically powered vehicle 5, in response to generation of control signal Sst, and turns off relays 30 and 40 that have been turned on in response to generation of control signal Sen, to end the charging period.

Figure 3:
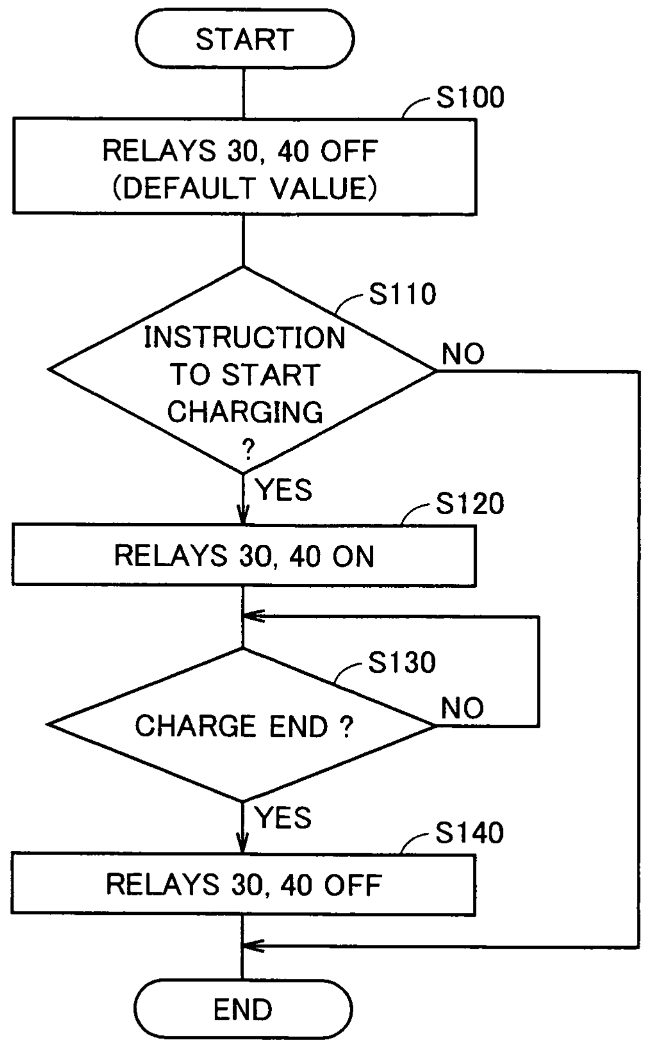
FIG. 3 is a flowchart for implementing charge control shown in FIG. 2 through software processing.

FIG. 3 is a flowchart for implementing charge control shown in FIG. 2 through software processing performed by control device 200. A program in accordance with the flowchart shown in FIG. 3 is run in a prescribed cycle after the end of drive of electrically powered vehicle 5, specifically, after turning off of the power switch.

Referring to FIG. 3, in step S100, control device 200 turns off relays 30 and 40, as a default value after the end of drive of electrically powered vehicle 5. Then, in step S110, control device 200 determines whether to generate the instruction to start charging or not. When the instruction to start charging is to be generated (YES in S110), control device 200 turns on relays 30 and 40 in step S120. Thus, the charging period is started. On the other hand, when the instruction to start charging is not to be generated (NO in S110), control device 200 ends the process while maintaining relays 30 and 40 in the OFF state. Namely, the processing in step S110 corresponds to the operation of charge start instruction unit 210 in FIG. 2.

Once the charging period is started, in step S130, control device 200 determines whether a charge end condition is satisfied or not, based on whether power storage device 100 has been charged to the target state or not. Namely, the processing in step S130 corresponds to the operation of charge end determination unit 230 in FIG. 2. Until the charge end condition is satisfied (NO in S130), the charging period is continued and relays 30 and 40 continues to be in the ON state.

On the other hand, when the charge end condition is satisfied (YES in S130), in step S140, control device 200 turns off relays 30 and 40. The charging period thus ends. The processing in steps S120 and S140 in accordance with the result of determination in steps S110 and S130 thus corresponds to the operation of relay control unit 220 in FIG. 2.

Referring again to FIG. 2, control signal Sst, that is, the instruction to start charging, is generated by charge start instruction unit 210 regardless of whether charge plug 20 is inserted in socket 15 or not, that is, whether electrically powered vehicle 5 is connected to external power supply 10 or not.

For example, charge start instruction unit 210 generates control signal Sst in response to the user's manual operation of charge request switch 205.

Alternatively, charge start instruction unit 210 automatically generates control signal Sst based on current time obtained from a clock (not shown) provided in electrically powered vehicle 5, for example, in response to the fact that prescribed time set in advance by the user has come. Alternatively, charge start instruction unit 210 can automatically generate control signal Sst in response to the fact that the remaining charge amount (SOC) of power storage device 100 estimated based on an inter-terminal output voltage, a temperature, a sum of input and output currents so far, or the like thereof is equal to or lower than a prescribed level.

Alternatively, power storage device 100 of which remaining charge amount can be estimated to a certain degree of accuracy based on an inter-terminal voltage may be configured such that, instead of constantly monitoring the remaining charge amount, the remaining charge amount of power storage device 100 is regularly estimated every prescribed period of time based on time count by a clock (not shown) and control signal Sst is automatically generated when the estimated remaining charge amount is equal to or lower than a prescribed level. It is thus not necessary for control device 200 to constantly monitor the remaining charge amount of power storage device 100, and therefore, electric power consumption by control device 200 after the end of drive of electrically powered vehicle 5 can be reduced and auxiliary machinery power supply 250 can be protected.

Figure 4:
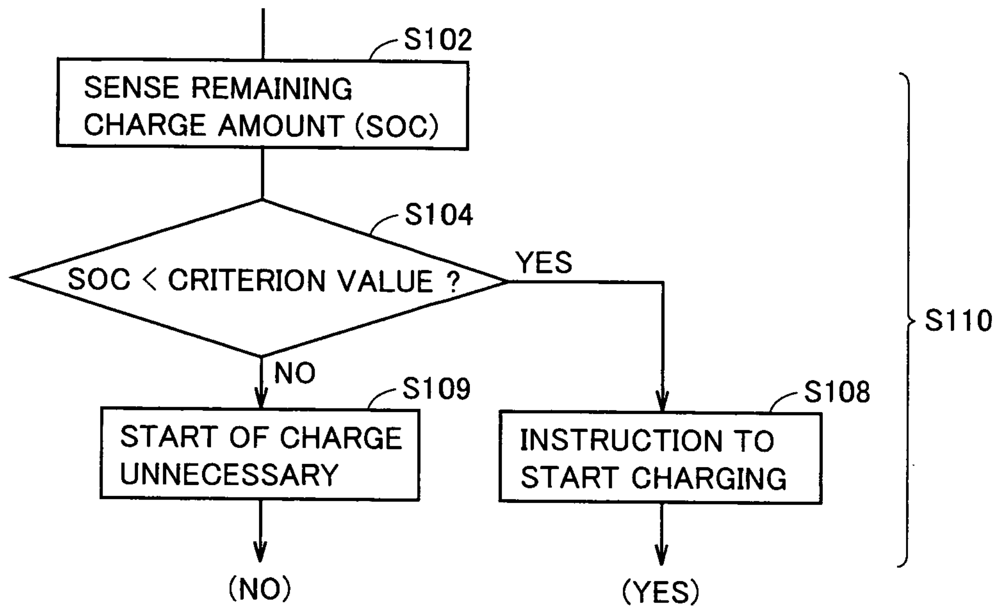
FIG. 4 is a first flowchart for implementing automatic generation of an instruction to start charging through software processing.
Figure 5:
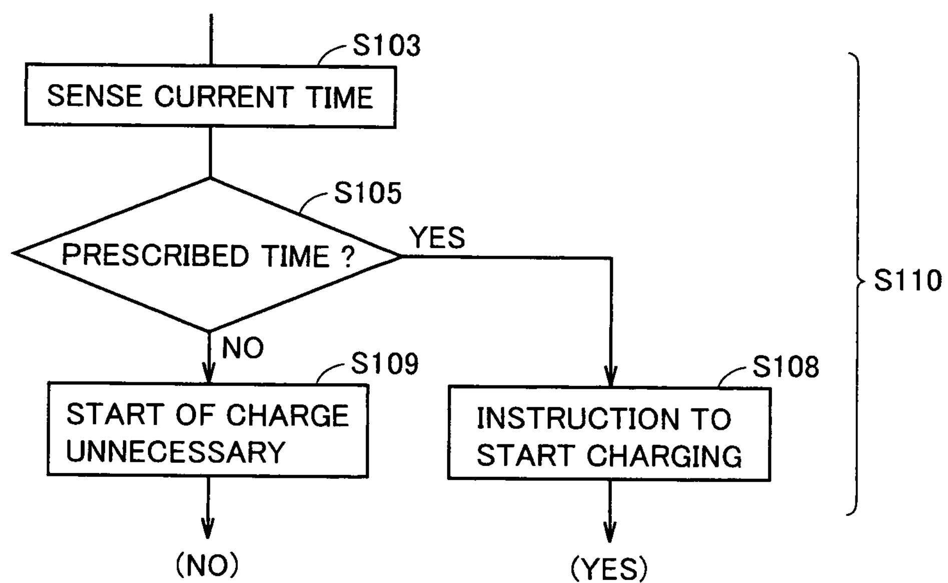
FIG. 5 is a second flowchart for implementing automatic generation of the instruction to start charging through software processing.

FIGS. 4 and 5 are flowcharts for implementing automatic generation of the instruction for start charging by charge start instruction unit 210 described above through software processing.

Referring to FIG. 4, step S110 shown in FIG. 3 is constituted of steps S102, S104, S108, and S109 which will be described below.

In step S102, control device 200 senses the remaining charge amount based on outputs from sensors (not shown) provided in power storage device 100, and in step S104, control device 200 determines whether the remaining charge amount is lower than a criterion value or not.

Then, when the remaining charge amount is lower than the criterion value (YES in S104), control device 200 indicates start of charge in step S108. Thus, determination as YES is made in step S110 (FIG. 2).

On the other hand, when the sensed remaining charge amount is equal to or greater than the criterion value (NO in S104), control device 200 determines in step S109 that start of charge is unnecessary. Here, determination as NO is made in step S110 (FIG. 2).

By thus determining start of charge, relays 30 and 40 are turned off during a period in which the remaining charge amount in power storage device 100 is sufficient, so that electric power consumption in external power supply 10 while external power supply 10 and electrically powered vehicle 5 are connected to each other can be suppressed.

Referring to FIG. 5, step S110 shown in FIG. 3 is constituted of steps S103, S105, S108, and S109 which will be described below.

In step S103, control device 200 senses current time from a clock (not shown), and control device 200 determines in step S105 whether prescribed time designated in advance by the user has come or not. Then, when the time designated by the user has come (YES in S105), control device 200 indicates start of charge in step S108. Thus, determination as YES is made in step S110 (FIG. 2).

On the other hand, when the time designated by the user has not yet come (NO in S105), control device 200 determines in step S109 that start of charge is unnecessary. Here, determination as NO is made in step S110 (FIG. 2).

By thus determining start of charge, as the charging period can be set in correspondence with the time designated by the user, charging or the like using inexpensive midnight electric power can be performed and convenience to the user can be improved. In addition, by turning off relays 30 and 40 until the designated time comes, electric power consumption in external power supply 10 while external power supply 10 and electrically powered vehicle 5 are connected to each other can be suppressed.

In addition, as described above, a control configuration for determining whether to start charging or not by performing the processing in accordance with the flowchart shown in FIG. 4 when prescribed time comes or each time a prescribed period of time elapses (that is, regularly), by combining the instruction to start charging based on the remaining charge amount shown in FIG. 4 with the instruction to start charging based on the time shown in FIG. 5, is also applicable.

As described above, in the electrically powered vehicle according to the first embodiment, all electric power consuming components mounted on electrically powered vehicle 5 can electrically be disconnected from power feed nodes N1 and N2, that is, from external power supply 10, during the non-charging period in which relays 30 and 40 are turned off, even while electrically powered vehicle 5 is connected to external power supply 10 through charge plug 20. Therefore, substantially zero stand-by power in external power supply 10 during the non-charging period while external power supply 10 and electrically powered vehicle 5 are connected to each other can be achieved. In addition, as compared with a configuration where the switching element (such as a relay, a contactor, or the like) is arranged on the side of external power supply 10, information is not communicated between electrically powered vehicle 5 and the outside (external power supply 10), and substantially zero stand-by power can be achieved.

In addition, the charging period during which relays 30 and 40 are turned on can be set in accordance with the user's manual operation or automatically, after the end of drive of electrically powered vehicle 5 (after turning off of the power switch).

(Second Embodiment)

Figure 6:
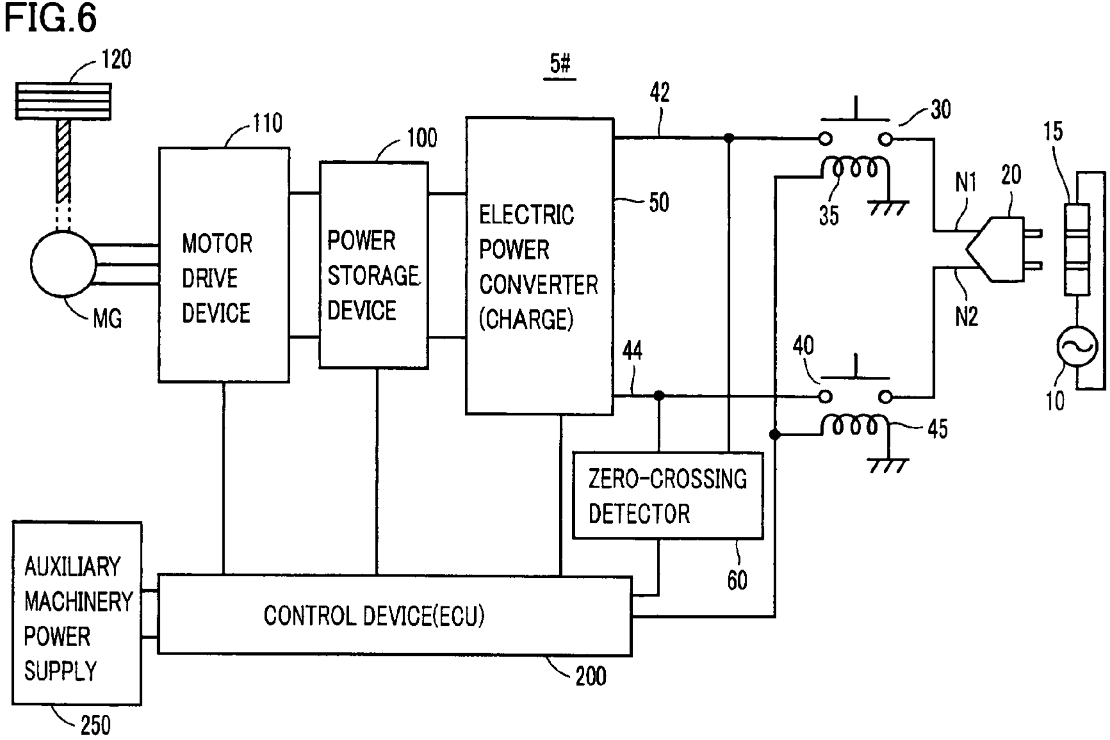
FIG. 6 is a schematic block diagram illustrating a configuration of a portion relating to charging from an external power supply in an electrically powered vehicle according to a second embodiment of the present invention.

FIG. 6 is a schematic block diagram illustrating a configuration of a portion relating to charging from the external power supply in an electrically powered vehicle according to a second embodiment of the present invention.

Comparing FIG. 6 with FIG. 1, an electrically powered vehicle 5# according to the second embodiment is different from electrically powered vehicle 5 according to the first embodiment in further including a zero-crossing detector 60 connected to internal power supply lines 42 and 44. As the configuration of electrically powered vehicle 5# is otherwise the same as electrically powered vehicle 5 shown in FIG. 1, detailed description will not be repeated.

Zero-crossing detector 60 detects an AC voltage across internal power supply lines 42 and 44, and generates a zero-crossing signal when the AC voltage varies from a high level (a positive voltage) to a low level (a negative voltage). Namely, zero-crossing detector 60 corresponds to a "detector" for detecting whether AC power from external power supply 10 is supplied to internal power supply lines 42 and 44 or not.

In an example where external power supply 10 is implemented by a DC power supply, the "detector" may be implemented by a voltage sensor for detecting whether a DC voltage equal to or higher than a prescribed level is applied to internal power supply lines 42 and 44 or not, instead of zero-crossing detector 60.

Figure 7:
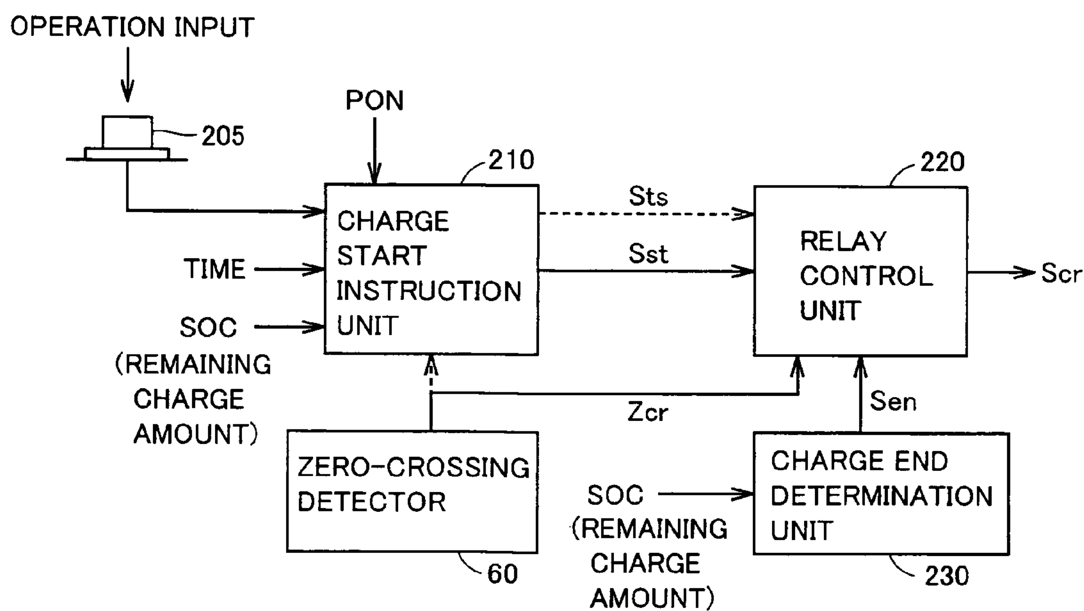
FIG. 7 is a schematic block diagram for illustrating control of charge of a power storage device by the external power supply in the electrically powered vehicle according to the second embodiment.

FIG. 7 is a schematic block diagram for illustrating control of charge of the power storage device by the external power supply in the electrically powered vehicle according to the second embodiment.

Comparing FIG. 7 with FIG. 2, in charge control in the electrically powered vehicle according to the second embodiment, a zero-crossing signal Zcr from zero-crossing detector 60 is further input to relay control unit 220. When control signal Sst is generated by charge start instruction unit 210, relay control unit 220 determines whether zero-crossing signal Zcr is generated by zero-crossing detector 60 or not.

Then, when zero-crossing signal Zcr is not generated, that is, when electrically powered vehicle 5# is not connected to external power supply 10 through charge plug 20, relay control unit 220 carries out control such that the charging period is not started even when control signal Sst is generated. Namely, in an example where electrically powered vehicle 5# is not connected to external power supply 10, relays 30 and 40 are maintained in the OFF state even though start of charge is requested.

Figure 8:
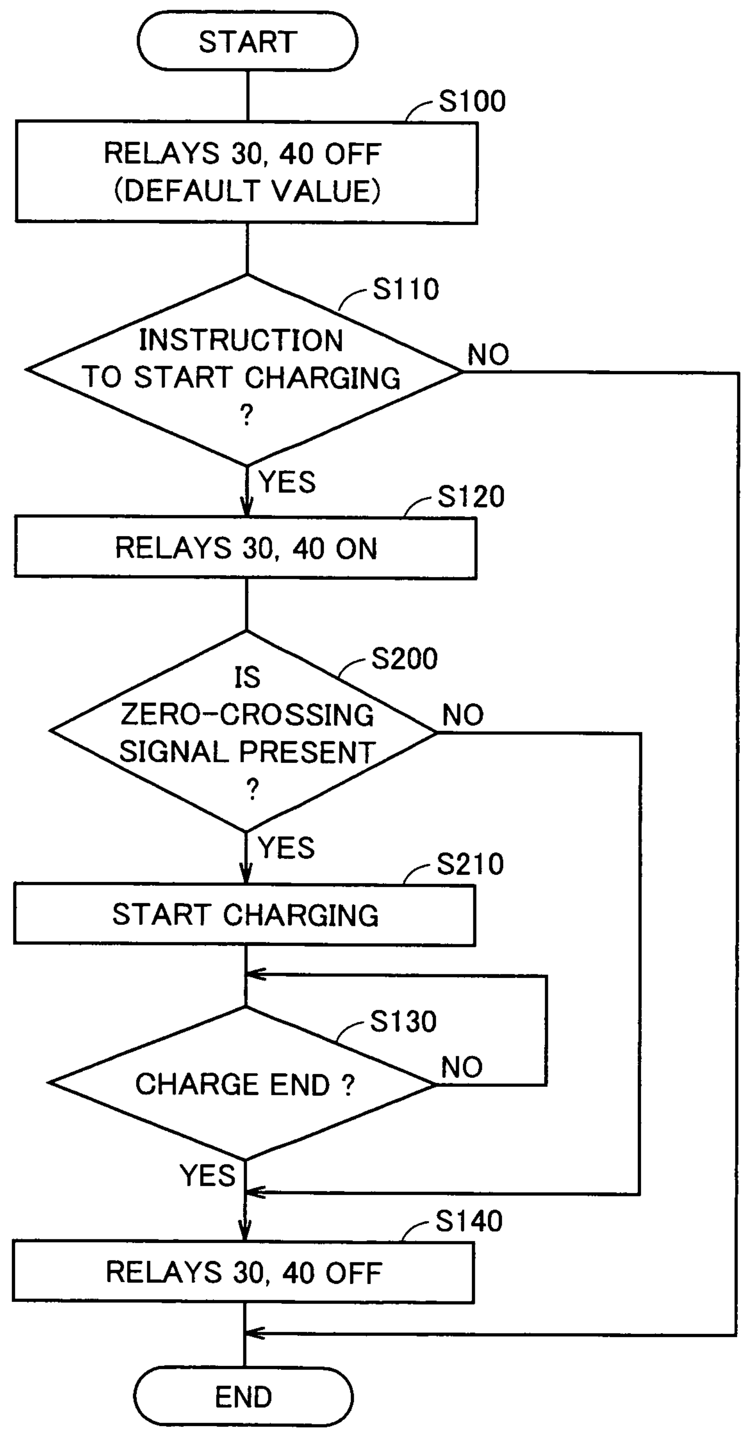
FIG. 8 is a flowchart for implementing charge control shown in FIG. 7 through software processing.

FIG. 8 is a flowchart for implementing charge control shown in FIG. 7 through software processing performed by control device 200.

Comparing FIG. 8 with FIG. 3, in charge control according to the second embodiment, control device 200 further performs steps S200 and S210 between steps S120 and S130 shown in FIG. 3.

When relays 30 and 40 are turned on in response to the instruction to start charging (S120), control device 200 determines in step S200 whether zero-crossing detector 60 is generating the zero-crossing signal or not. Then, when the zero-crossing signal is generated (YES in S200), control device 200 starts charging in step S210. Then, charging is continued until it is determined in step S130 that power storage device 100 has been charged to the target state.

On the other hand, when the zero-crossing signal is not generated (NO in S200), control device 200 skips step S130 and turns off relays 30 and 40 in step S140.

According to such a configuration, when the instruction to start charging is generated based on the user's manual operation or automatically based on the remaining charge amount or the time, relays 30 and 40 are turned on for a moment on a trial basis, and whether electrically powered vehicle 54 is connected to external power supply 10 through charge plug 20 or not can be checked. When electrically powered vehicle 5# is not connected to external power supply 10 and charging cannot be performed, relays 30 and 40 can be turned off, so that occurrence of leakage due to formation of an unnecessary electrical path can be prevented.

(Variation of Second Embodiment)

Referring again to FIG. 7, in electrically powered vehicle 5# according to the second embodiment, in addition to control signal Sst described in the first and second embodiments, a control signal Sts for positively detecting connection of charge plug 20 based on zero-crossing signal Zcr from zero-crossing detector 60 is further generated.

As shown with a dotted line in FIG. 7, zero-crossing signal Zcr is further input to charge start instruction unit 210. In addition to the example described in the first embodiment, charge start instruction unit 210 turns on control signal Sts for a prescribed period from the time point of turn-off of power ON signal PON (for example, within several minutes) or for a prescribed period regularly provided after turn-off of the power ON signal.

When control signal. Sts is generated, relay control unit 220 provides the ON period of relays 30 and 40 on a trial basis. Charge start instruction unit 210 determines whether electrically powered vehicle 5# is connected to external power supply 10 through charge plug 20 or not, based on whether zero-crossing signal Zcr is present or not during this ON period. Then, when zero-crossing signal Zcr is detected, charge start instruction unit 210 indicates start of charge. On the other hand, when zero-crossing signal Zcr is not detected, the charging period is not started and relays 30 and 40 are turned off.

Insertion of charge plug 20 in socket 15 to connect electrically powered vehicle 5# to external power supply 10 after turning off of the power switch can be considered as user's intention to charge power storage device 100. Therefore, in the variation of the second embodiment, when zero-crossing signal Zcr is sensed while control signal Sts is generated, the charging period is also started as in the first and second embodiments.

Figure 9:
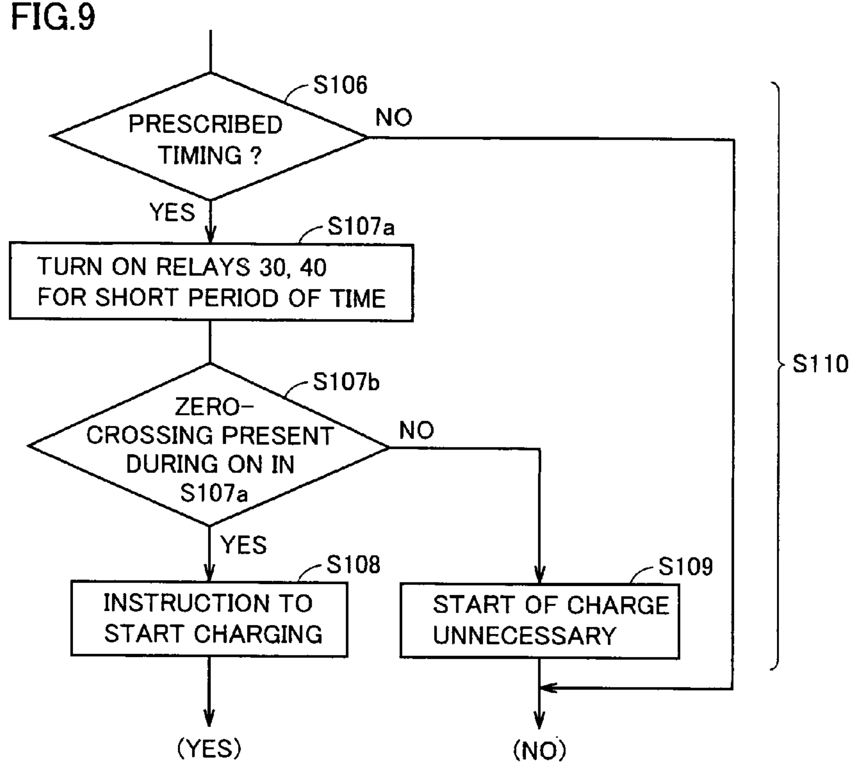
FIG. 9 is a flowchart for implementing, with software, generation of an instruction to start charging based on zero-crossing detection according to a variation of the second embodiment.

FIG. 9 is a flowchart for implementing, with software, generation of the instruction to start charging based on zero-crossing detection according to the variation of the second embodiment.

Referring to FIG. 9, step S110 shown in FIG. 8 is constituted of steps S106, S107*a*, S107*b*, S108, and S109.

In step S106, control device 200 determines whether prescribed timing to generate control signal Sts has come or not. As described above, the prescribed timing is provided for a prescribed period of time from the operation to turn off the power ON switch (approximately for several minutes) and/or only for a short period of time every prescribed cycle (for example, every one hour) after turning off of the power ON switch.

While control signal Sts is not generated, that is, during a period other than the prescribed timing above (NO in S106), control device 200 makes determination as NO in step S110 in FIG. 8.

On the other hand, when control signal Sts is generated (YES in S106), control device 200 turns on relays 30 and 40 only for a short period of time in step S107*a* and determines in step S107*b* whether the zero-crossing signal is generated or not during the ON period of relays 30 and 40 in step S107*a*.

Then, when the zero-crossing signal is generated (YES in S107*b*), control device 200 indicates start of charge in step S108. Thus, determination as YES is made in step S110 (FIG. 9). In this case, a sequence may be arranged such that the charging period is started while continuing the ON state of relays 30 and 40 in step S107*a*.

On the other hand, when the zero-crossing signal is not generated (NO in S107*b*), control device 200 determines in step S109 that start of charge is unnecessary. Here, determination as NO is made in step S110 (FIG. 9).

Thus, according to the variation of the second embodiment, in addition to the effect in the second embodiment, when external power supply 10 is connected to power supply vehicle 5# through charge plug 20 after the end of drive of electrically powered vehicle 5# (after turning off of the power ON switch), start of charge can automatically be indicated.

(Third Embodiment)

Figure 10:
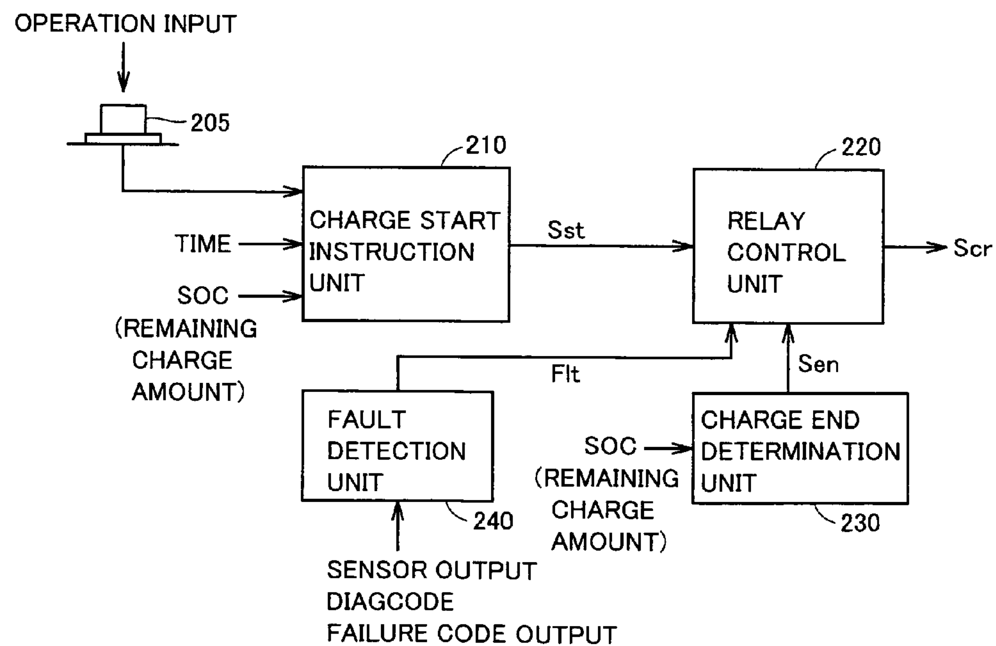
FIG. 10 is a schematic block diagram for illustrating control of charge of a power storage device by an external power supply according to a third embodiment.

FIG. 10 is a schematic block diagram for illustrating control of charge of the power storage device by the external power supply according to a third embodiment. A configuration for charge control according to the third embodiment can be implemented by modifying the configuration of control device 200 in any of electrically powered vehicle 5 (the first embodiment) and electrically powered vehicle 5# (the second embodiment).

Referring to FIG. 10, in the configuration for charge control according to the third embodiment, a fault detection unit 240 is further provided as compared with the configuration according to the first embodiment shown in FIG. 2.

Fault detection unit 240 determines whether a fault impeding charge of power storage device 100 by external power supply 10 has occurred in electrically powered vehicle 5, 5# or not, based on outputs from various sensors mounted on electrically powered vehicle 5, a diagcode, or a failure code output. For example, when an element in electric power converter 50 has failed or when the remaining charge amount cannot accurately be sensed due to failure of sensors in power storage device 100, fault detection unit 240 generates a fault detection signal Flt.

When fault detection signal Flt is generated by fault detection unit 240, relay control unit 220 maintains relays 30 and 40 in the OFF state, even when a control signal requesting turn-on of relays 30 and 40 (control signal Sst shown in FIGS. 3 and 7 or control signal Sts shown in FIG. 7) is generated by charge start instruction unit 210.

Figure 11:
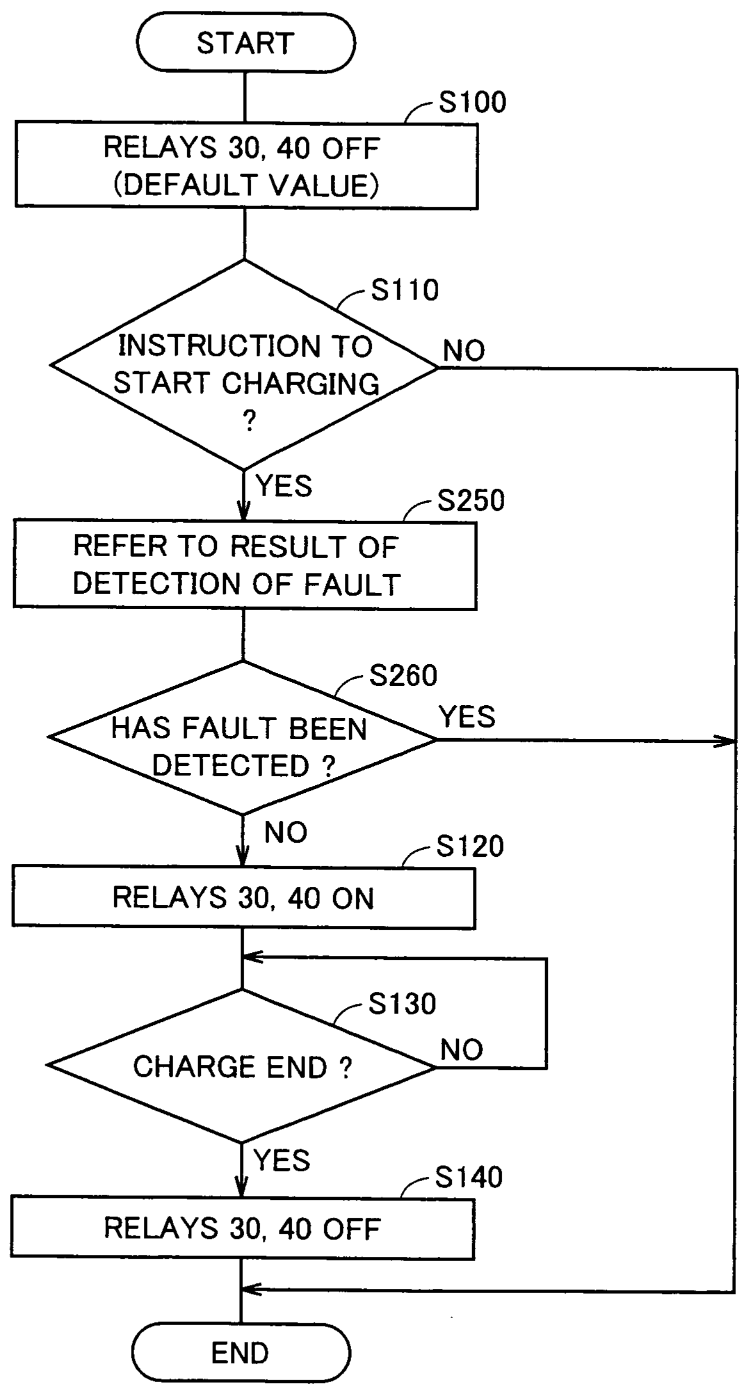
FIG. 11 is a flowchart for implementing charge control shown in FIG. 10 through software processing.

FIG. 11 is a flowchart for implementing control of charge by the external power supply according to the third embodiment through software processing performed by control device 200.

As can be understood from comparison between FIG. 11 and FIG. 3, in control of charge by the external power supply according to the third embodiment, when determination as YES is made in step S110 shown in FIG. 3, that is, when the instruction to start charging is generated, control device 200 performs step S250 and step S260 before the processing in step S120.

In step S250, control device 200 refers to a result of detection of fault in electrically powered vehicle 5, 5#, and in step S260, control device 200 checks whether such a fault that fault detection signal Flt shown in FIG. 10 is generated has been detected or not.

When fault detection signal Flt is not generated (NO in S260), control device 200 performs step S120 and subsequent steps and starts the charging period. On the other hand, when fault detection signal Flt is generated (YES in S260), control device 200 skips the processing in step S120 and subsequent steps and the process ends. Namely, even when the instruction to start charging is generated, relays 30 and 40 are maintained in the OFF state.

According to such a configuration, when such a fault as impeding charge of power storage device 100 by external power supply 10 occurs in electrically powered vehicle 5, 5#, charging by external power supply 10 can forcibly be aborted as a fail-safe measure. Consequently, troubles due to overcharge by external power supply 10 can be prevented. In addition, unnecessary electric power consumption in external power supply 10 can also be prevented.

(As to Configuration of Motor Drive Device and Electric Power Converter for Charging)

As can be understood from the description above, in the embodiment of the present invention, the present invention is applicable without particularly limiting a circuit configuration of motor drive device 110 and electric power converter 50 shown in FIG. 1. Here, a representative configuration example of motor drive device 110 will be described.

Figure 12:
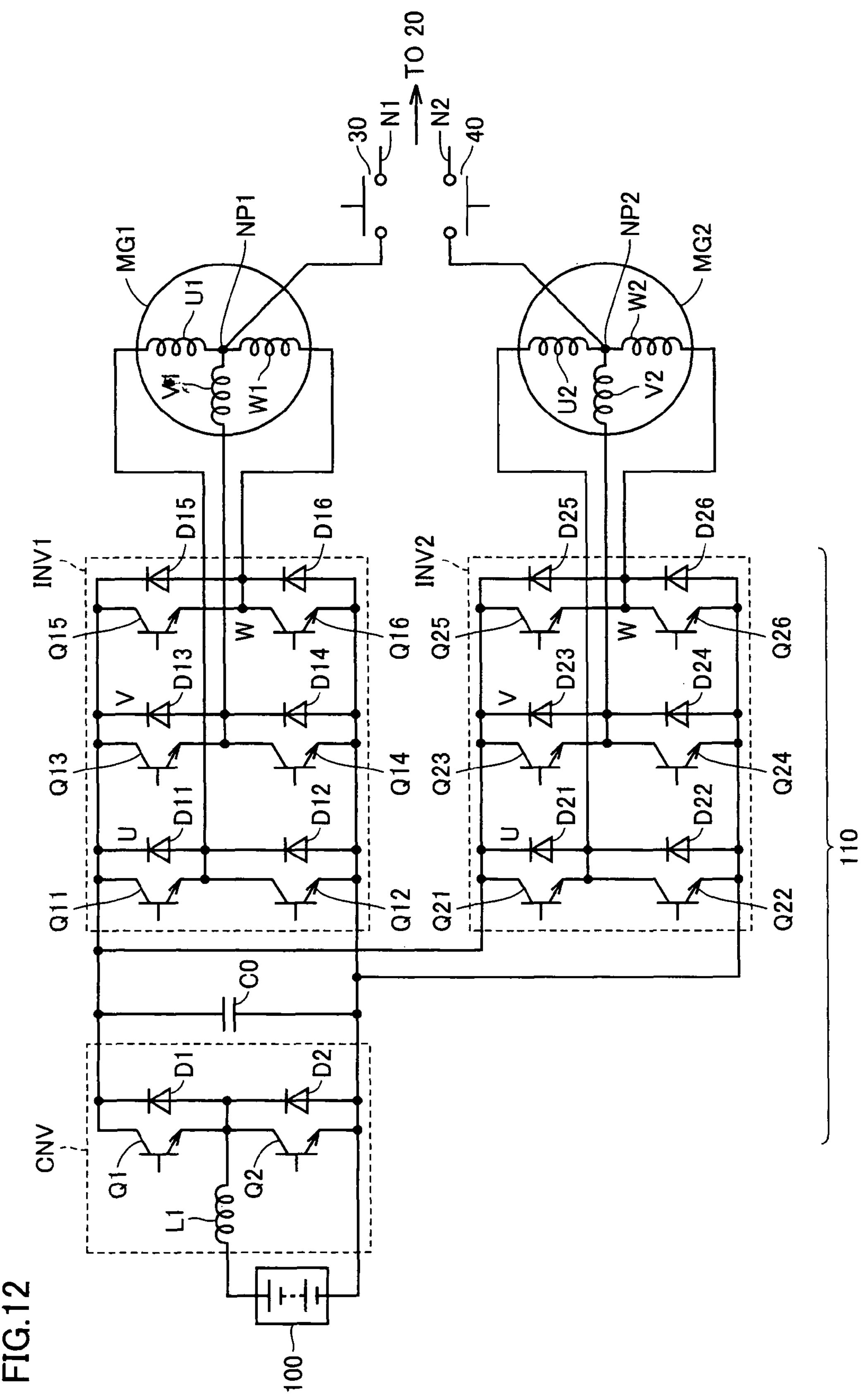
FIG. 12 is a circuit diagram showing a representative configuration of a motor drive device shown in FIGS. 1 and 7.

Referring to FIG. 12, motor drive device 110 includes a converter CNV configured to be able to boost an output voltage (DC voltage) of power storage device 100, a smoothing capacitor C0 for smoothing the DC voltage output from converter CNV, and inverters IV1 and IV2 for converting the DC voltage held by smoothing capacitor C0 to an AC voltage. Two motor-generators MG1 and MG2 are provided in correspondence with inverters IV1 and IV2, respectively.

Converter CNV includes a reactor L1, semiconductor switching elements Q1 and Q2, and anti-parallel diodes D1 and D2 connected in parallel to semiconductor switching elements Q1 and Q2. Converter CNV can operate as what is called a boost chopper, based on ON/OFF control of semiconductor switching elements Q1 and Q2. Namely, a voltage applied to smoothing capacitor C0, that is, the output voltage from the converter, can variably be controlled by controlling duty of semiconductor switching elements Q1 and Q2.

Inverter IV1 is a common three-phase inverter constituted of semiconductor switching elements Q11 to Q16 and anti-parallel diodes D11 to D16. Similarly, inverter IV2 is a common three-phase inverter constituted of semiconductor switching elements Q21 to Q26 and anti-parallel diodes D21 to D26.

Motor-generators MG1 and MG2 are commonly connected to an engine (not shown) and a power split device (not shown), and motor-generator MG2 is configured to be able to generate drive force for wheel 120, as in motor-generator MG shown in FIG. 1.

Namely, in the configuration shown in FIG. 12, drive force for wheel 120 is generated based on output from the engine and output from motor-generator MG2. In addition, motor-generator MG2 carries out regenerative power generation during regenerative braking of electrically powered vehicle 5, 5#. The regeneratively generated power is converted to a DC voltage by inverter IV2, the DC voltage is applied to smoothing capacitor C0, and power storage device 100 is charged therewith through converter CNV.

In addition, motor-generator MG1 operates as a power generator as it is driven to revolve by rotational force of the engine, and at the time of start-up of the engine, motor-generator MG1 can operate as the motor, as a starter of the engine. Moreover, the power split device is implemented by a planetary gear mechanism, so that a continuously variable transmission with which a speed of motor-generators MG1 and MG2 and a ratio between the engine speeds can variably be controlled can be implemented and an operating point of the engine can appropriately be set.

Motor drive device 110 shown in FIG. 12 may also be configured such that power storage device 100 is charged by connecting a neutral point NP1 of motor-generator MG1 and a neutral point NP2 of motor-generator MG2 to single-phase AC external power supply 10 without separately providing electric power converter 50 for charging by external power supply 10 as in FIGS. 1 and 7.

Here, the electric power converter for converting an AC voltage from external power supply 10 to a DC voltage is implemented by a reactor component (a coil winding) of motor-generators MG1 and MG2 and inverters IV1 and IV2. Thus, electric power converter 50 may also be implemented by motor drive device 110.

In such a charging configuration as well, neutral points NP1 and NP2 are connected to power feed nodes N1 and N2 through relays 30 and 40, and power feed nodes N1 and N2 are connected to none of vehicle-mounted components consuming electric power as described in connection with FIG. 1. Thus, the charge control configuration with which substantially zero stand-by power in external power supply 10 is achieved during the non-charging period while external power supply 10 and electrically powered vehicle 5, 5# are connected to each other according to the first and second embodiments and the variation of the second embodiment described above can be achieved.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Industrial Applicability

The present invention can be utilized in an electrically powered vehicle such as an electric car, a hybrid car or the like, that can be charged by an external power supply.

The invention claimed is:

1. An electrically powered vehicle that can be charged by an external power supply, comprising:

a power feed node electrically connected to said external power supply through a connection device;

a power storage device for storing electric power to be used for generating vehicle drive force, configured such that it can be charged with electric power supplied by said external power supply;

a switching element interposed in an electrical path from said power feed node to said power storage device;

a control device operating by using electric power from an auxiliary power storage device provided separately from said power storage device, for controlling opening and closing of said switching element in correspondence with a period during which said power storage device is charged; and an internal power supply line for transmitting electric power from said external power supply, wherein said switching element is connected between said power feed node and said internal power supply line, said electric power consuming component includes a detector connected to said internal power supply line, for detecting whether electric power is supplied from said external power supply to said internal power supply line, all electric power consuming components mounted on said electrically powered vehicle being arranged to electrically be disconnected from said power feed node, as a result of opening of said switching element, said control device includes a charge start instruction unit for generating and instruction for requesting charge of said power storage device, a charge end determination unit for determining end of charge of said power storage device, and an opening and closing control unit for turning on said switching element in response to generation of said instruction for requesting charge and opening said switching element in response to determination as said end of charge, after power supply of said electrically powered vehicle is stopped, at least one prescribed timing to turn on said switching element is provided, and said charge start instruction unit generates said instruction for requesting charge when said detector detects electric power supply to said internal power supply line at said prescribed timing when said switching element was turned on.

2. The electrically powered vehicle according to claim 1, wherein said charge start instruction unit also generates said instruction for requesting charge of said power storage device in response to an operation input to a prescribed instruction unit, and said opening and closing control unit causes said switching element to open, when said detector detects electric power supply to said internal power supply line at said prescribed timing, even when said instruction for requesting charge is generated.

3. The electrically powered vehicle according to claim 1, wherein said charge start instruction unit also generates said instruction for requesting charge in response to a remaining charge amount of said power storage device, and said opening and closing control unit causes said switching element to open, when said detector detects electric power supply to said internal power supply line at said prescribed timing, even when said instruction for requesting charge is generated.

4. The electrically powered vehicle according to claim 3, wherein said charge start instruction unit regularly senses the remaining charge amount of said power storage device and generates said instruction for requesting charge when the sensed remaining charge amount is equal to or lower than a prescribed value.

5. The electrically powered vehicle according to claim 1, wherein said charge start instruction unit also generates said instruction for requesting charge in accordance with time, and said opening and closing control unit causes said switching element to open, when said detector detects electric power supply to said internal power supply line at said prescribed timing, even when said instruction for requesting charge is generated.

6. The electrically powered vehicle according to claim 1, wherein said control device further includes a fault detection unit for detecting occurrence of a fault in said electrically powered vehicle, and said opening and closing control unit maintains opening of said switching element, even when said fault detection unit detects occurrence of the fault.

7. The electrically powered vehicle according to claim 2, wherein said control device further includes a fault detection unit for detecting occurrence of a fault in said electrically powered vehicle, and said opening and closing control unit maintains opening of said switching element, even when said fault detection unit detects occurrence of the fault.

8. The electrically powered vehicle according to claim 3, wherein said control device further includes a fault detection unit for detecting occurrence of a fault in said electrically powered vehicle, and said opening and closing control unit maintains opening of said switching element, even when said fault detection unit detects occurrence of the fault.

9. The electrically powered vehicle according to claim 4, wherein said control device further includes a fault detection unit for detecting occurrence of a fault in said electrically powered vehicle, and said opening and closing control unit maintains opening of said switching element, even when said fault detection unit detects occurrence of the fault.

10. The electrically powered vehicle according to claim 5, wherein said control device further includes a fault detection unit for detecting occurrence of a fault in said electrically powered vehicle, and said opening and closing control unit maintains opening of said switching element, even when said fault detection unit detects occurrence of the fault.

11. The electrically powered vehicle according to claim 1, wherein said electric power consuming component includes an electric power converter provided between said internal power supply line and said power storage device, for converting electric power supply from said external power supply received through said internal power supply line into electric power for charging said power storage device.

12. The electrically powered vehicle according to claim 1, wherein said switching element is configured to close while a current flows in an excitation circuit and to open while a current does not flow, and current flow and absence of current flow in said excitation circuit are controlled by said control device.

* * * * *